US012082317B2

(12) United States Patent
Vasquez et al.

(10) Patent No.: US 12,082,317 B2
(45) Date of Patent: Sep. 3, 2024

(54) LIGHT FIXTURE CONTROLLER HAVING SELECTABLE LIGHT INTENSITY AND COLOR TEMPERATURE

(71) Applicant: ABL IP Holding LLC, Atlanta, GA (US)

(72) Inventors: Charles Richard Vasquez, Atlanta, GA (US); Ryan D. Meldahl, Newark, OH (US); Paul W. Lewis, Grantville, GA (US)

(73) Assignee: ABL IP Holding LLC, Atlanta, GA (US)

( * ) Notice: Subject to any disclaimer, the term of this patent is extended or adjusted under 35 U.S.C. 154(b) by 398 days.

(21) Appl. No.: 17/071,220

(22) Filed: Oct. 15, 2020

(65) Prior Publication Data

US 2021/0136888 A1 May 6, 2021

Related U.S. Application Data

(60) Provisional application No. 62/928,169, filed on Oct. 30, 2019.

(51) Int. Cl.
*H05B 45/20* (2020.01)
*F21V 23/00* (2015.01)
(Continued)

(52) U.S. Cl.
CPC ........... *H05B 45/20* (2020.01); *F21V 23/007* (2013.01); *F21V 23/04* (2013.01); *F21V 23/06* (2013.01);
(Continued)

(58) Field of Classification Search
CPC .. H05B 45/3578; H05B 45/325; H05B 45/20; H05B 45/10; F21Y 2115/10; F21V 23/06; F21V 23/04; F21V 23/007
See application file for complete search history.

(56) References Cited

U.S. PATENT DOCUMENTS 6,201,351 B1 3/2001 Rudolph et al.
6,323,598 B1 11/2001 Guthrie et al.
(Continued)

FOREIGN PATENT DOCUMENTS

CN 106555981 4/2017
EP 2768283 8/2014
(Continued)

OTHER PUBLICATIONS

Ecolocity LED, Connection Instructions—4 Knob RGBW LED Controller with RF Remote, 2017, https://s3.amazonaws.com/cdn.ecolocityled.com/downloads/LC-LF-3RGBW_1.pdf (Year: 2017).*
(Continued)

*Primary Examiner* — Raymond R Chai
(74) *Attorney, Agent, or Firm* — Kilpatrick Townsend & Stockton LLP

(57) ABSTRACT

A controller for a light fixture includes light intensity control circuitry to control intensity of light and color temperature control circuitry to control color temperature of light produced by a light engine, a first switch having a first switch cover disposed on an exterior portion of the controller, the first switch configured to communicate with the light intensity control circuitry to cause the light engine to produce a specified light intensity based on a position of the first switch cover, and a second switch having a second switch cover disposed on the exterior portion of the controller, the second switch configured to communicate with the color temperature control circuitry to cause the light engine to produce a specified color temperature of light based on a position of the second switch cover. The position of the first switch cover and the position of the second switch cover are manually selectable.

20 Claims, 12 Drawing Sheets

(51) Int. Cl.
*F21V 23/04* (2006.01)
*F21V 23/06* (2006.01)
*F21Y 115/10* (2016.01)
*H05B 45/10* (2020.01)
*H05B 45/325* (2020.01)

(52) U.S. Cl.
CPC .......... *H05B 45/10* (2020.01); *H05B 45/325* (2020.01); *F21Y 2115/10* (2016.08)

(56) References Cited

U.S. PATENT DOCUMENTS 6,995,355 B2 2/2006 Rains, Jr. et al.
7,014,336 B1 3/2006 Ducharme et al.
7,088,059 B2 8/2006 McKinney et al.
7,135,664 B2 11/2006 Vornsand et al.
7,173,383 B2 2/2007 Vornsand et al.
7,329,998 B2 2/2008 Jungwirth
7,416,312 B1 8/2008 McDermott
7,423,387 B2 9/2008 Robinson et al.
7,497,590 B2 3/2009 Rains, Jr. et al.
7,520,634 B2 4/2009 Ducharme et al.
7,883,239 B2 2/2011 Rains, Jr. et al.
8,172,415 B2 5/2012 Wegh et al.
8,203,260 B2 6/2012 Li et al.
8,228,002 B2 7/2012 Newman, Jr. et al.
RE43,606 E 8/2012 Bruwer
8,317,362 B2 11/2012 Ku et al.
8,373,362 B2 2/2013 Chemel et al.
8,436,549 B2 5/2013 Hasnain
8,598,809 B2 12/2013 Negley et al.
8,633,650 B2 1/2014 Sauerlaender
8,638,045 B2 1/2014 Kunst et al.
8,669,722 B2 3/2014 Yeh et al.
8,710,754 B2 4/2014 Baddela et al.
8,791,642 B2 7/2014 van de Ven et al.
8,823,289 B2 9/2014 Linz et al.
8,872,438 B2 10/2014 Zhou et al.
8,878,443 B2 11/2014 Luo et al.
8,890,419 B2 11/2014 Stack
8,890,436 B2 11/2014 Chou
8,914,312 B2 12/2014 McLaughlin et al.
8,941,312 B2 1/2015 McRae
8,975,823 B2 3/2015 Yang et al.
9,055,647 B2 6/2015 Sutardja et al.
9,072,149 B2 6/2015 Wu et al.
9,125,271 B2 9/2015 Martins et al.
9,144,131 B2 9/2015 Wray
9,210,760 B2 12/2015 Sanders et al.
9,277,607 B2 3/2016 Ramer et al.
9,289,269 B2 3/2016 Valteau et al.
9,301,359 B2 3/2016 Wray
9,374,876 B2 6/2016 Alpert et al.
9,386,653 B2 7/2016 Kuo et al.
9,414,457 B2 8/2016 Fukuda et al.
9,485,826 B2 11/2016 Bohler et al.
9,538,603 B2 1/2017 Shearer et al.
9,538,604 B2 1/2017 Yadav et al.
9,544,951 B1 1/2017 O'Neil et al.
9,544,969 B2 1/2017 Baddela et al.
9,554,441 B2 1/2017 Sutardja et al.
9,560,710 B2 1/2017 Beijer et al.
9,603,213 B1 3/2017 Suttles et al.
9,665,262 B2 5/2017 Hole
9,719,642 B1 8/2017 Macias
9,730,291 B1 8/2017 Janik et al.
9,801,250 B1 10/2017 Halliwell
9,820,350 B2 11/2017 Pyshos et al.
9,892,693 B1 2/2018 Kumar et al.
9,900,945 B1 2/2018 Janik et al.
10,091,855 B2 10/2018 Van Winkle
10,117,300 B2 10/2018 Doheny et al.
10,163,405 B2 12/2018 Kumar et al.
10,290,265 B2 5/2019 Kumar et al.
10,292,233 B1 5/2019 Udavant et al.
10,299,335 B2 5/2019 Pyshos et al.
10,299,336 B2 5/2019 Bowen et al.
10,299,337 B1 5/2019 Chen et al.
10,448,471 B1 10/2019 Chowdhury et al.
10,575,380 B2 2/2020 Udavant et al.
10,660,174 B2 5/2020 Huang et al.
10,674,579 B2 6/2020 Bruckner et al.
10,681,784 B2 6/2020 Bruckner et al.
10,856,384 B2 12/2020 Chen et al.
10,874,006 B1 12/2020 Davis et al.
10,904,970 B2 1/2021 Udavant et al.
10,952,292 B2 3/2021 Chowdhury et al.
10,966,306 B1 3/2021 Recker et al.
11,026,307 B2 6/2021 Rodriguez
11,317,492 B2 * 4/2022 Jeswani ................ H05B 45/00
11,499,703 B1 * 11/2022 Smith .................. F21V 23/004
11,979,169 B2 * 5/2024 Zhang .................. H03M 1/785
2001/0013854 A1 * 8/2001 Ogoro ..................... H04M 1/22
345/102
2005/0162851 A1 7/2005 Kazar et al.
2005/0237737 A1 * 10/2005 Kim ...................... H05B 47/10
362/197
2005/0243022 A1 11/2005 Negru
2006/0007682 A1 * 1/2006 Reiff ...................... F21S 10/02
362/253
2006/0220586 A1 10/2006 Latham
2006/0226795 A1 10/2006 Walter et al.
2006/0238136 A1 10/2006 Johnson, III et al.
2006/0285310 A1 12/2006 Shyu
2007/0159750 A1 7/2007 Peker et al.
2007/0262724 A1 11/2007 Mednik et al.
2008/0130298 A1 6/2008 Negley et al.
2009/0026913 A1 1/2009 Mrakovich
2009/0218960 A1 9/2009 Lyons et al.
2009/0256483 A1 10/2009 Gehman et al.
2010/0097406 A1 4/2010 Zulch
2010/0141175 A1 6/2010 Hasnain et al.
2010/0171633 A1 7/2010 Baker et al.
2010/0207534 A1 8/2010 Dowling et al.
2010/0214764 A1 8/2010 Chaves et al.
2010/0283322 A1 11/2010 Wibben
2010/0308738 A1 12/2010 Shteynberg et al.
2011/0058372 A1 3/2011 Lerman et al.
2011/0062872 A1 3/2011 Jin et al.
2011/0068702 A1 3/2011 van de Ven et al.
2011/0084615 A1 4/2011 Welten
2011/0115407 A1 5/2011 Wibben et al.
2011/0210678 A1 9/2011 Grajcar
2011/0273495 A1 11/2011 Ward et al.
2011/0316441 A1 12/2011 Huynh
2012/0080944 A1 4/2012 Recker et al.
2012/0081005 A1 4/2012 Lin et al.
2012/0081009 A1 4/2012 Shteynberg et al.
2012/0098460 A1 4/2012 Miyasaka et al.
2012/0242247 A1 9/2012 Hartmann et al.
2012/0253542 A1 10/2012 Nurmi et al.
2012/0286753 A1 11/2012 Zhong et al.
2013/0002167 A1 1/2013 Van de Ven
2013/0021580 A1 1/2013 Morgan et al.
2013/0038222 A1 2/2013 Yeh et al.
2013/0043795 A1 2/2013 Burayez et al.
2013/0049610 A1 2/2013 Chen
2013/0082616 A1 4/2013 Bradford et al.
2013/0140988 A1 6/2013 Maxik et al.
2013/0141013 A1 6/2013 Kodama et al.
2013/0169158 A1 7/2013 He et al.
2013/0200806 A1 8/2013 Chobot
2013/0229125 A1 9/2013 Yan et al.
2013/0249422 A1 9/2013 Kerstens et al.
2013/0249440 A1 9/2013 Doshi et al.
2013/0343052 A1 12/2013 Yen
2014/0001959 A1 1/2014 Motley et al.
2014/0035472 A1 2/2014 Raj et al.
2014/0042920 A1 2/2014 Chou
2014/0184076 A1 7/2014 Murphy
2014/0197750 A1 7/2014 Cash
2014/0210357 A1 7/2014 Yan et al.
2014/0210364 A1 7/2014 Cash et al.
2014/0252967 A1 9/2014 Van de Ven et al.

(56) References Cited

U.S. PATENT DOCUMENTS

| | | | | |
|---|---|---|---|---|
| 2014/0312777 | A1 | 10/2014 | Shearer et al. | |
| 2015/0009666 | A1 | 1/2015 | Keng et al. | |
| 2015/0097489 | A1 | 4/2015 | Wu et al. | |
| 2015/0245441 | A1* | 8/2015 | McCune, Jr. .......... | H05B 45/10 315/185 R |
| 2015/0256760 | A1 | 9/2015 | Ju et al. | |
| 2015/0351169 | A1 | 12/2015 | Pope et al. | |
| 2015/0359061 | A1 | 12/2015 | Adler | |
| 2016/0007420 | A1 | 1/2016 | Gong et al. | |
| 2016/0098950 | A1 | 4/2016 | Nicholson | |
| 2016/0128155 | A1 | 5/2016 | Petluri et al. | |
| 2016/0323949 | A1 | 11/2016 | Lee | |
| 2016/0323951 | A1* | 11/2016 | Clark .................... | F21V 21/116 |
| 2016/0352975 | A1 | 12/2016 | Kervec et al. | |
| 2016/0360590 | A1* | 12/2016 | McCune, Jr. ........ | H05B 45/395 |
| 2016/0363308 | A1 | 12/2016 | Shum | |
| 2016/0366746 | A1 | 12/2016 | Van de Ven et al. | |
| 2016/0366751 | A1 | 12/2016 | Xu et al. | |
| 2016/0374177 | A1 | 12/2016 | Chen | |
| 2017/0019973 | A1 | 1/2017 | Beck et al. | |
| 2017/0027033 | A1 | 1/2017 | Chobot et al. | |
| 2017/0086265 | A1 | 3/2017 | Akiyama et al. | |
| 2017/0086280 | A1 | 3/2017 | Boomgaarden et al. | |
| 2017/0105129 | A1 | 4/2017 | Teplin et al. | |
| 2017/0135186 | A1 | 5/2017 | O'Neil et al. | |
| 2017/0164440 | A1 | 6/2017 | Hu et al. | |
| 2017/0238392 | A1 | 8/2017 | Shearer et al. | |
| 2017/0354013 | A1 | 12/2017 | DeMayo et al. | |
| 2018/0035510 | A1 | 2/2018 | Doheny et al. | |
| 2018/0103523 | A1 | 4/2018 | Yan et al. | |
| 2018/0116029 | A1 | 4/2018 | Pyshos et al. | |
| 2018/0166026 | A1 | 6/2018 | Kumar et al. | |
| 2018/0242422 | A1 | 8/2018 | Choi et al. | |
| 2018/0249547 | A1 | 8/2018 | Wang et al. | |
| 2018/0288847 | A1 | 10/2018 | Halliwell | |
| 2018/0310381 | A1 | 10/2018 | Bowen et al. | |
| 2018/0368218 | A1 | 12/2018 | Petluri et al. | |
| 2018/0368232 | A1 | 12/2018 | Doheny et al. | |
| 2019/0027099 | A1 | 1/2019 | Kumar et al. | |
| 2019/0037663 | A1 | 1/2019 | Van Winkle | |
| 2019/0088213 | A1 | 3/2019 | Kumar et al. | |
| 2019/0090327 | A1 | 3/2019 | Zolotykh et al. | |
| 2019/0141812 | A1 | 5/2019 | Chen | |
| 2019/0191512 | A1 | 6/2019 | Zeng et al. | |
| 2019/0268984 | A1 | 8/2019 | Song et al. | |
| 2019/0268991 | A1 | 8/2019 | Li | |
| 2019/0338895 | A1* | 11/2019 | Jeswani .................. | F21V 23/04 |
| 2019/0394851 | A1 | 12/2019 | Sinphay | |
| 2020/0053849 | A1* | 2/2020 | Chowdhury ........... | H05B 45/48 |
| 2020/0200341 | A1* | 6/2020 | On ........................... | H01H 9/18 |
| 2020/0380563 | A1 | 12/2020 | Shiffert et al. | |
| 2020/0389469 | A1 | 12/2020 | Litichever et al. | |
| 2021/0282248 | A1 | 9/2021 | Magielse et al. | |
| 2022/0046757 | A1 | 2/2022 | Sanders | |
| 2023/0084711 | A1* | 3/2023 | Bogdanowicz ........ | G09G 5/006 |

FOREIGN PATENT DOCUMENTS

| | | | |
|---|---|---|---|
| EP | 2728972 | 8/2015 | |
| JP | 2011258517 | 12/2011 | |
| WO | 2011084135 | 7/2011 | |
| WO | WO-2016037213 A1 * | 3/2016 | ............. H05B 47/10 |

OTHER PUBLICATIONS

Ecolocity LED, Specification—4 Knob RGBW LED Controller with RF Remote, 2017, https://s3.amazonaws.com/cdn.ecolocityled.com/downloads/rgbw_4knob_rf_specs_1.pdf (Year: 2017).* superbrightleds.com, LDK-RGB3_Manual, 2018, https://www.superbrightleds.com/amfile/file/download/file/v3yIEAtGyM2XvH4LoBuELRqucrbRhJV6/product/113856/ (Year: 2018).*

Eileen Patton, EIC2800/2600 Search Report, 2024, Scientific & Technical Information Center (Year: 2024).*

2×4 LED Flat Panel, Cybertech, Main Place Lighting, Available Online At: https://shopmainplacelighting.com/collections/commercial-lighting/products/2-x-4-led-flat-panel-1, Accessed from Internet on May 14, 2019, 3 pages.

3 Inch WarmDim/Tunable White, Aculux, Accessed from Internet on May 15, 2020, 3 pages.

38W LED Panel—Color Selectable, Venture Lighting, Available Online At: https://www.venturelighting.com/led-lighting/indoor-lighting-fixtures/panels-and-troffers/color-selectable-panels/standard-product/pn38592.html, Accessed from Internet on May 14, 2019, 6 pages.

EASY Lighting Control, Application Guide, OSRAM, Available Online At: www.osram.com/easy, Apr. 2015, 25 pages.

Human Centric Lighting, Helvar, Intelligent Colour Product Series, Available Online At: helvar.com/second-sun, Dec. 4, 2017, 4 pages.

IW Cove MX Powercore-Premium Interior Linear LED Cove and Accent Luminaire with Intelligent White Light, Philips Lighting, Product Family Leafelet, Jan. 21, 2019, 3 pages.

LED Panel 1230 40W Colour Changeable, Fuzion Lighting, Information sheet, Available online at: http://www.fuzionlighting.com.au/product/led-panel-40-cct, Accessed from Internet on Mar. 19, 2019, 6 pages.

LED Universal Ceiling Fan Light Kit, Hampton Bay, Use and Care Guide, Nov. 7, 2019, 22 pages.

LLP LED Light Panel, Main Place Lighting, Specification Sheet, Available Online At: https://cdn.shopify.com/s/files/1/2048/2207/files/LLP-Specification-Sheet-1.pdf, Accessed from Internet on Mar. 19, 2019, 4 pages.

Noble Pro LED Line Voltage Task Lighting NLLP Series, AFX, Available Online At: www.AFXinc.com, Accessed from Internet at May 13, 2019, 1 page.

Par Lite Led, VariWhite, Coemar, User Manual Version 1.0, Jun. 2011, 19 pages.

ViaCon LED-Products, Trilux Simplify your Light, Available Online At: https://www.trilux.com/en/products/viacon-led/, Accessed from Internet on May 13, 2019, 11 pages.

Warmdim® & Tunable White Adjustable/downlight/wall Wash 1000 Lumen Led 3 Baffle Down Light Trim AX3 WDTW with 3DBAF Trim, Aculux Luminaire, Mar. 20, 2019, 3 pages.

6" IC LED Retrofit Warmdim (TM) Downlight Trim, Juno, Oct. 2012, 2 pages.

Biery et al., Controlling LEDs, Lutron Electronics Corporation Incorporated, May 2014, 20 pages.

Sun, Challenges and Opportunities for High Power White LED Development, DOE SSL R&D Workshop, Feb. 1, 2012, pp. 1-12.

* cited by examiner

800

| Lumens | Intensity Switch | Color Temp Switch | CCT |
|---|---|---|---|
| 3000 LM | Left | Left | 3500K |
| 4000 LM | Center | Left | 3500K |
| 5000 LM | Right | Left | 3500K |
| 3000 LM | Left | Center | 4000K |
| 4000 LM | Center | Center | 4000K |
| 5000 LM | Right | Center | 4000K |
| 3000 LM | Left | Right | 5000K |
| 4000 LM | Center | Right | 5000K |
| 5000 LM | Right | Right | 5000K |

FIG. 8

LIGHT FIXTURE CONTROLLER HAVING SELECTABLE LIGHT INTENSITY AND COLOR TEMPERATURE

CROSS-REFERENCES TO RELATED APPLICATIONS

This application claims the benefit of U.S. Provisional Application No. 62/928,169, filed Oct. 30, 2019; the contents of which are hereby incorporated herein by reference in their entirety.

BACKGROUND

Unless otherwise indicated herein, the materials described in this section are not prior art to the claims in this application and are not admitted to be prior art by inclusion in this section.

A lighting fixture may include a light element capable of producing different color temperatures of white light and different light intensities suitable for different applications. For example, some applications may require a color temperature that produces a cool white light while other applications may require a color temperature that produces a warm white light. Similarly, in different applications it may be necessary to increase or decrease the light intensity of a lighting fixture.

SUMMARY

Systems and methods for selecting light intensity and color temperature of light generated by a light fixture are provided.

According to various aspects there is provided a controller for a light fixture. In some aspects, the controller may include light intensity control circuitry configured to control intensity of light produced by a light engine; color temperature control circuitry configured to control color temperature of light produced by the light engine; and a first switch having a first switch cover disposed on an exterior portion of the controller. The first switch may be configured to communicate with the light intensity control circuitry and may be operable to cause the light engine to produce a specified light intensity based on a position of the first switch cover. The controller may further include a second switch having a second switch cover disposed on the exterior portion of the controller. The second switch may be configured to communicate with the color temperature control circuitry and may be operable to cause the light engine to produce a specified color temperature of light based on a position of the second switch cover. The position of the first switch cover and the position of the second switch cover may be manually selectable. A form factor and profile of the controller may be configured to mount the controller above the light engine inside a light fixture housing.

The color temperature control circuitry may include pulse width modulator circuitry. The position of the second switch cover may cause the pulse width modulator circuitry to provide separate pulse width modulated signals to separate light elements of the light engine to cause the light engine to produce light having different color temperatures. The position of the first switch cover and the position of the second switch cover may independently control the light intensity and the color temperature, respectively, produced by the light engine.

The first switch cover, the second switch cover, and the exterior portion of the controller may cooperate to provide detents indicating positions of the first switch and the second switch. A selected light intensity and a selected color temperature corresponding to positions of the first switch cover and the second switch cover, respectively, may be indicated by graphics or lettering disposed on the exterior portion of the controller.

According to various aspects there is provided a light fixture. In some aspects, the light fixture may include a light engine and a controller coupled to the light engine. The controller may include light intensity control circuitry configured to control intensity of light produced by the light engine; color temperature control circuitry configured to control color temperature of light produced by the light engine; and a first switch having a first switch cover disposed on an exterior portion of the controller. The first switch may be configured to communicate with the light intensity control circuitry and may be operable to cause the light engine to produce a specified light intensity based on a position of the first switch cover. The controller may further include a second switch having a second switch cover disposed on the exterior portion of the controller. The second switch may be configured to communicate with the color temperature control circuitry and may be operable to cause the light engine to produce a specified color temperature of light based on a position of the second switch cover. The position of the first switch cover and the position of the second switch cover may be manually selectable.

The light engine may include a set of light elements, each set of light elements may include a string of light emitting diodes (LEDs), each string of LEDs may be configured to produce light having a different color temperature than others string of LEDs.

According to various aspects there is provided a method of installing a controller for a light fixture. In some aspects, the method may include attaching the controller to a surface of a light fixture housing; electrically connecting the controller to a light engine driver; electrically connecting the controller to a light engine; and independently selecting a light intensity and a color temperature for the light fixture via selected switch positions on an exterior portion of the controller.

Selecting a light intensity may include manually selecting a position of a first switch cover disposed on an exterior portion of the controller. The selection of the light intensity may be indicated by graphics or lettering disposed on the exterior portion of the controller. The first switch cover and the exterior portion of the controller may cooperate to provide detents indicating positions of the first switch cover corresponding to the selected light intensity.

Selecting a color temperature may include manually selecting a position of a second switch cover disposed on an exterior portion of the controller. The selection of the color temperature may be indicated by graphics or lettering disposed on the exterior portion of the controller. The second switch cover and the exterior portion of the controller may cooperate to provide detents indicating positions of the second switch cover corresponding to the selected color temperature.

Mounting the controller to a surface of the light fixture housing may include mounting the controller to an interior surface of the light fixture housing above the light engine, or mounting the controller to an exterior of the light fixture housing.

Numerous benefits are achieved by way of the various embodiments over conventional techniques. For example, the various embodiments provide systems and methods that can be used to simplify selecting light intensity and color temperature of light generated by a light fixture. In some embodiments, a controller includes switches having selectable positions that can be utilized to set intensity and color temperature of light generated by a light fixture. The form factor and profile of embodiments of the controller enable the controller to be used in a variety of types of light fixtures. These and other embodiments along with many of the advantages and features are described in more detail in conjunction with the text below and attached figures.

BRIEF DESCRIPTION OF THE DRAWINGS

Aspects and features of the various embodiments will be more apparent by describing examples with reference to the accompanying drawings, in which:

FIG. 8 is a table showing light intensity and color temperature of the light corresponding to the switch positions of the controller according to some aspects of the present disclosure;

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

In order to suit various applications, both the color temperature and intensity of light produced by a lighting fixture may be selected. Aspects of the present disclosure provide apparatuses and methods for selecting the color temperature and light intensity of light produced by a lighting fixture. A controller operable to provide adjustable light output and switchable color temperature in a single module for use with light engine drivers (e.g., standard light engine drivers) may include switches utilized to concurrently select light intensity and color temperature of light emitted from a light fixture. The form factor and low profile of the controller enable the controller to be utilized in a variety of light fixtures to control both lumen output and color temperature in a single module. Conventional solutions utilize separate devices to control color temperature and intensity, rendering them unsuitable for some applications due to size and/or space constraints.

Figure 1:
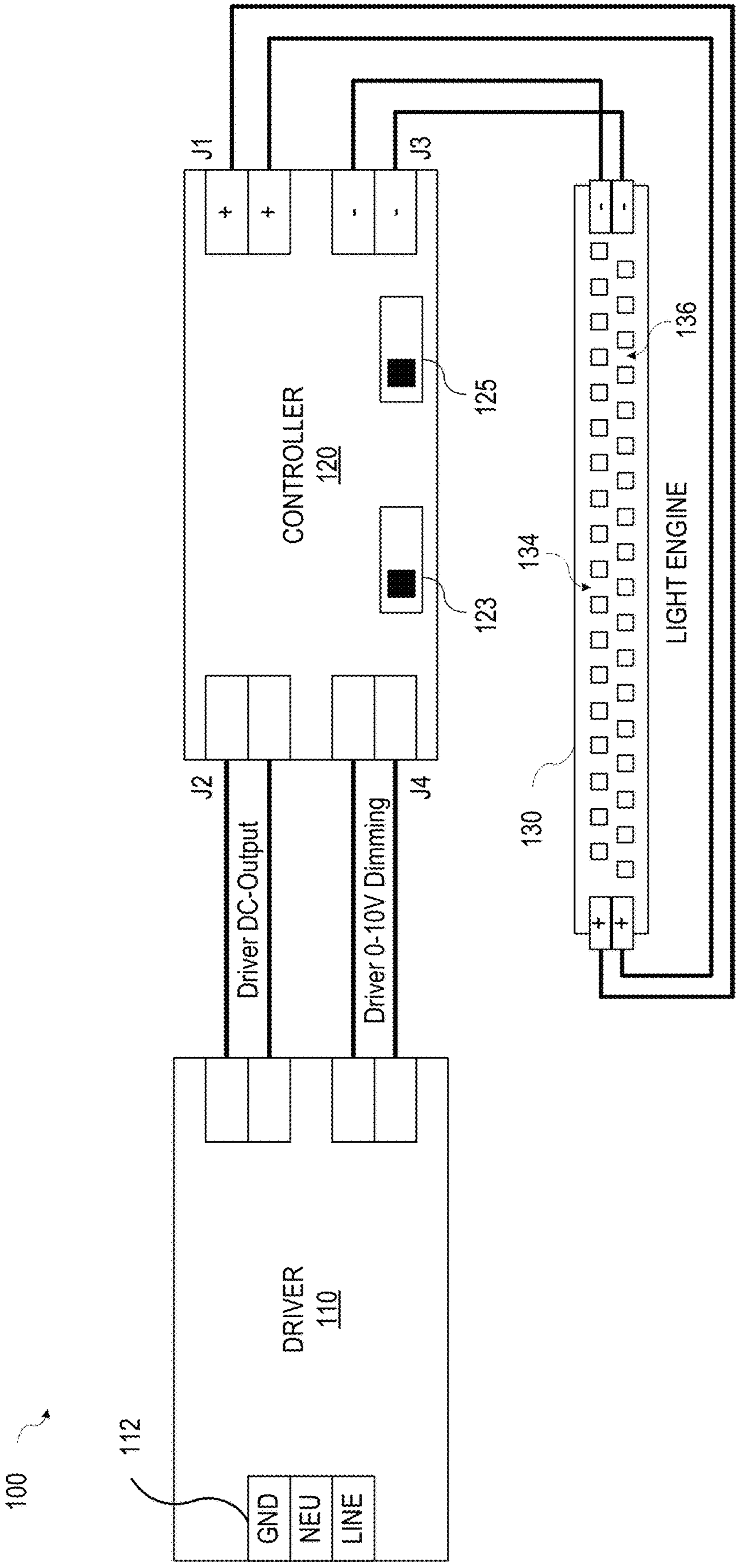
FIG. 1 is a schematic block diagram illustrating electrical connections between a driver, a controller, and a light engine of a light fixture according to some aspects of the present disclosure.

FIG. 1 is a schematic block diagram illustrating electrical connections between a driver, a controller, and a light engine of a light fixture according to some aspects of the present disclosure. Referring to FIG. 1, the driver (e.g., light engine driver) 110 may receive power via a power connector 112 and may supply power to the controller 120. The controller 120 may control the power supplied to the light engine 130 of the light fixture 100. The controller 120 may also control the power supplied by the driver 110. By controlling the power supplied by the driver 110 as well as the power provided to the light engine 130, the controller 120 may control both the color temperature and intensity of the light produced by the light engine 130. Switches 123 and 125 may be used to concurrently select light intensity and color temperature of light, respectively, emitted from the light engine 130.

The light engine 130 may include a first light element 134, for example, a first string of connected light-emitting diodes (LEDs), and a second light element 136, for example, a second string of connected LEDs. The first light element 134 may produce light at a first color temperature, for example, 2700K, and the second light element 136 may produce light at a second color temperature, for example, 6000K. By separately controlling the light output of the first light element 134 and the second light element 136 via the controller 120, the light engine 130 may produce light at various color temperatures within the range of the two colors of the first light element 134 and the second light element 136.

Figure 2:
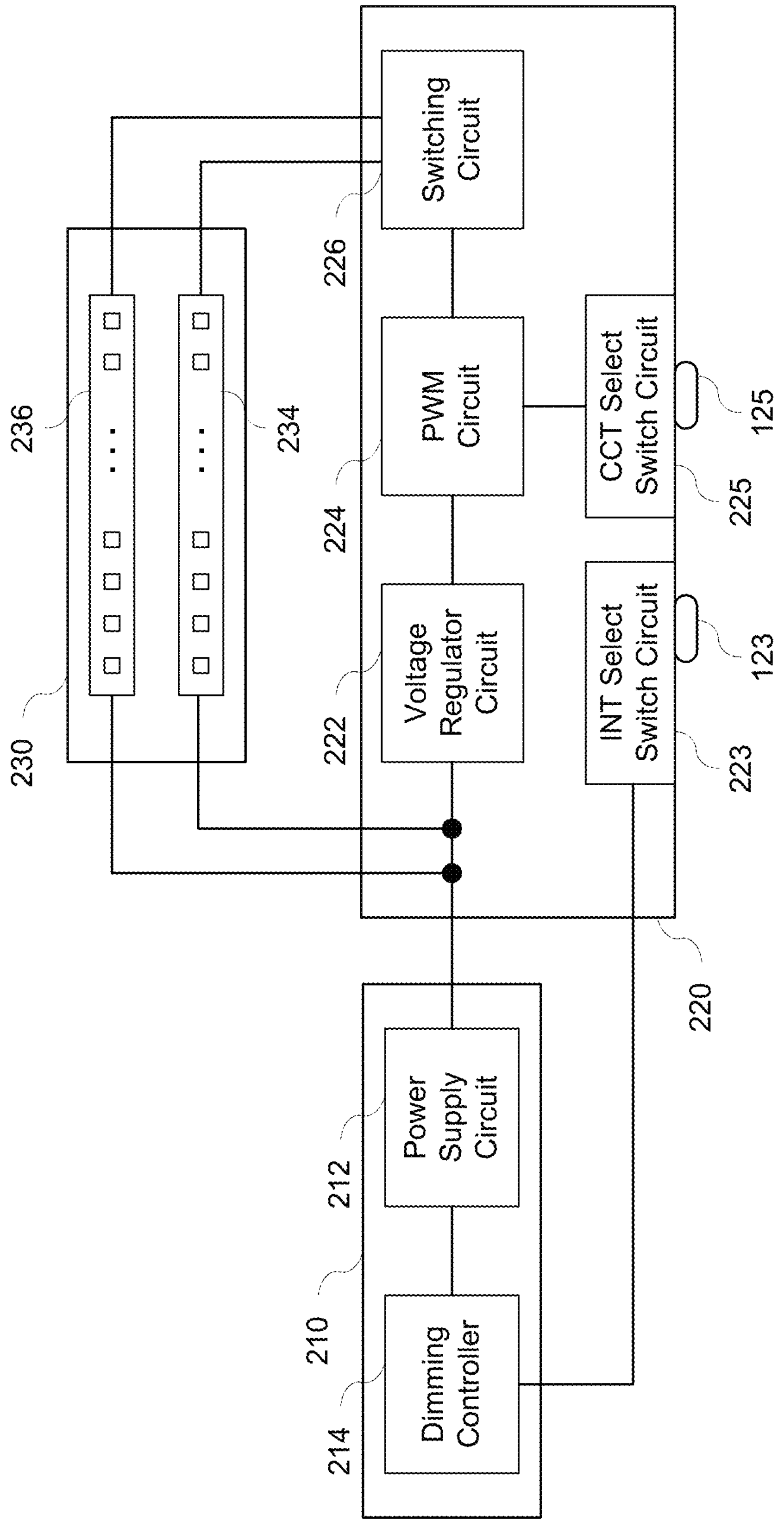
FIG. 2 is a block diagram illustrating elements of the driver, controller, and light engine of FIG. 1 according to some aspects of the present disclosure.

FIG. 2 is a block diagram illustrating elements of the driver 110, controller 120, and light engine 130 of FIG. 1 according to some aspects of the present disclosure. Referring to FIG. 2, the driver 210 may include a power supply circuit 212 and a dimming controller 214. The dimming controller 214 (e.g., a 0-10V dimming controller) may regulate a voltage supplied by the power supply circuit 212 to provide a regulated output current or voltage.

The controller 220 may include a voltage regulator circuit 222, a pulse width modulator circuit 224, a switching circuit 226, an intensity select switch circuit 223, and a color temperature select switch circuit 225. The controller 220 may pass the output from the driver 210 to the light engine 230. The output from the driver 210 may also be provided to the voltage regulator circuit 222 of the controller 220. The voltage regulator circuit 222 may output a regulated voltage, for example, a voltage in a range of about 3V-5V, to supply power to the internal circuitry of the controller 220. The voltage regulator circuit 222 may provide the regulated output voltage to the pulse width modulator circuit 224. The pulse width modulator (PWM) circuit 224 may provide a pulse width modulated signal to the switching circuit 226 to provide pulse width modulated control of the light engine 230.

The light engine 230 may include a first light element 234 and a second light element 236. The first light element 234 may be, for example, a first string of connected light-emitting diodes (LEDs) and may produce light at a first color temperature, for example, 2700K. The second light element 236 may be, for example, a second string of connected LEDs and may produce light at a second color temperature, for example, 6000K. Other light elements may be used without departing from the scope of the present disclosure. The light elements may produce light at color temperatures other than the example color temperatures indicated above without departing from the scope of the present disclosure. In some implementations, each light element may include multiple strings of connected LEDs, and each of the multiple strings of connected LEDs may produce the same or different color temperatures. Further, while FIG. 2 illustrates two light elements, additional light elements may be used without departing from the scope of the present disclosure.

The color temperature of the light produced by the light fixture may be controlled by color temperature control circuitry of the controller 220 based on the setting of the color temperature select switch 125 associated with the color temperature select switch circuit 225. The color temperature select switch 125 may be, for example, but not limited to, a linear mechanical switch, a rotary mechanical switch, a continuously variable switch, etc. Various types of switches may be used for the color temperature select switch 125 without departing from the scope of the present disclosure.

The color temperature select switch 125 setting may control the on-time of the pulses produced by the PWM circuit 224 to drive the light engine 230 via the switching circuit 226. The PWM circuit 224 may provide separate signals having the same or different pulse widths to the first light element 234 and the second light element 236. Various color temperatures (also referred to herein as Kelvin colors) within the range of the two colors of the first and second light elements 234, 236 used in the light engine 230 may be generated based on the pulse widths supplied by the PWM circuit 224. In some implementations, the first and second light elements 234, 236 may be 2700K and 6000K LEDs, respectively, and the resultant color may be based on the PWM on-time of each LED color programed by the setting of the color temperature select switch 125 on the controller 220.

The intensity (e.g., lumens) of the light produced by the light fixture may be controlled by light intensity control circuitry of the controller 220 based on the setting of the intensity select switch 123 associated with the intensity select switch circuit 223. The intensity levels for the light engine 230 may be set by switching different resistors of the intensity select switch circuit 223 in or out of a regulator circuit (not shown) for the dimming controller 214 (e.g., the 0-10V dimming controller) of the driver 210. Other methods of selecting light intensity using the intensity select switch 123 may be used without departing from the scope of the present disclosure. In some implementations, intensity levels of 3000, 4000, or 5000 lm may be generated by the setting of the intensity select switch 123 on the controller 220. The intensity select switch 123 may be, for example, but not limited to, a linear mechanical switch, a rotary mechanical switch, a continuously variable switch, etc. Various types of switches may be used for the intensity select switch 123 without departing from the scope of the present disclosure. Examples of intensity and color temperature obtained for various intensity select switch 123 and color temperature select switch 125 settings are illustrated in FIG. 8.

Figure 3:
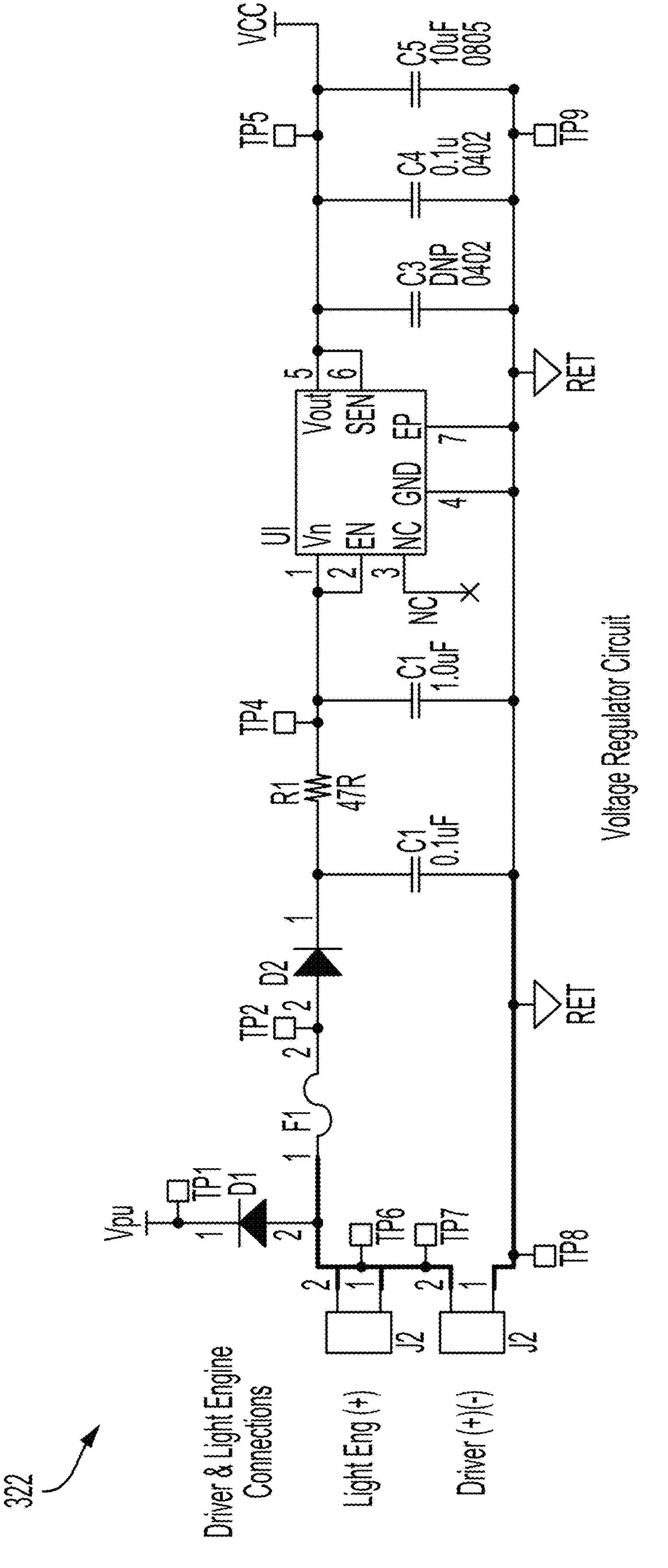
FIG. 3 is a schematic diagram illustrating some details of an example voltage regulator circuit for the controller according to some aspects of the present disclosure.
Figure 4A:
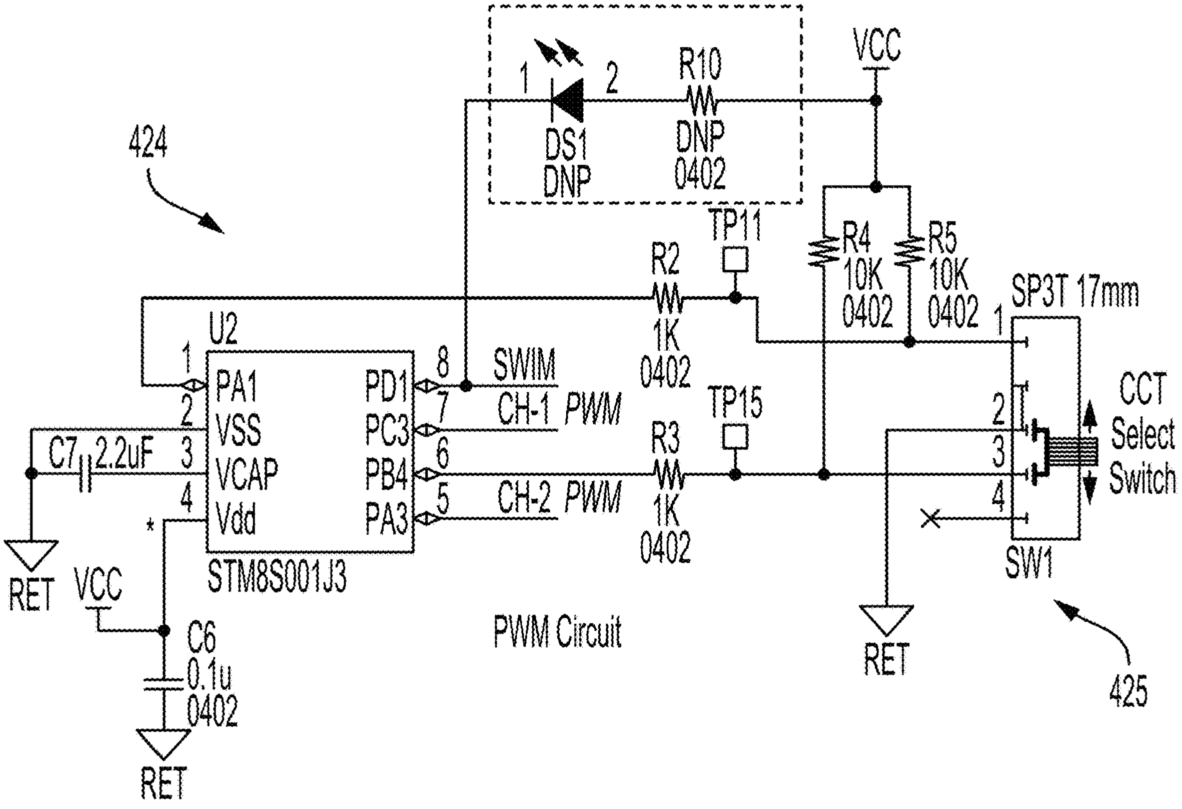
FIG. 4A is a schematic diagram illustrating some details of an example of a pulse-width modulator circuit for the controller according to some aspects of the present disclosure.
Figure 4B:
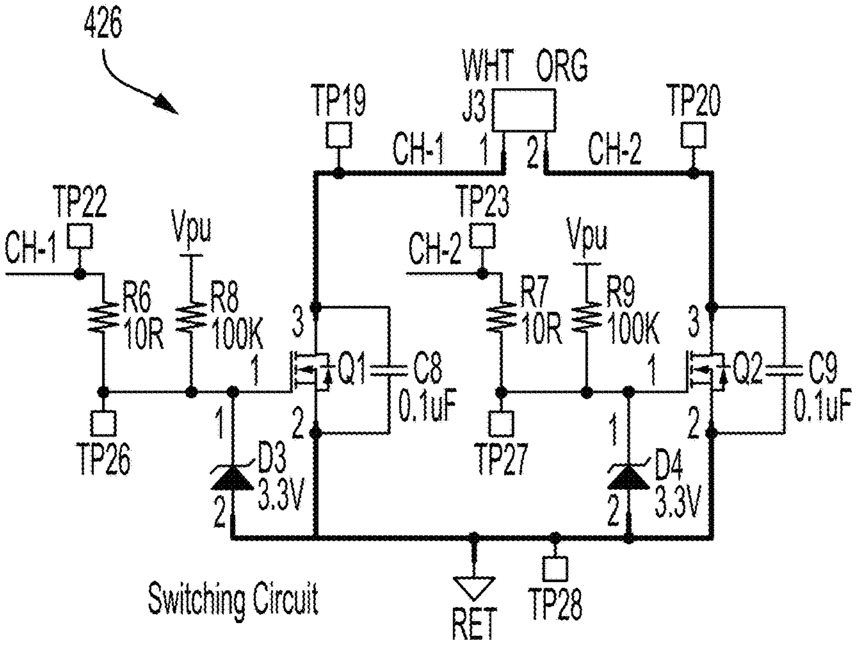
FIG. 4B is a schematic diagram illustrating some details of an example of a switching circuit for the controller according to some aspects of the present disclosure.
Figure 5:
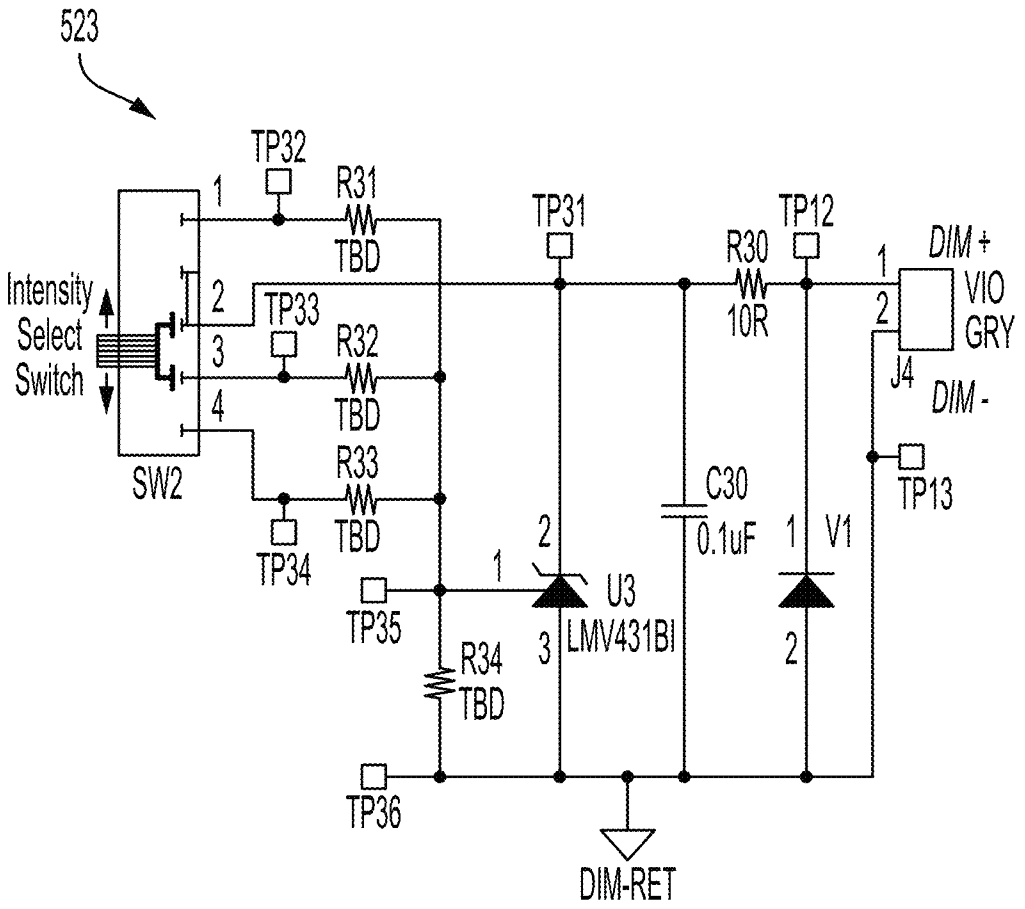
FIG. 5 is a schematic diagram illustrating some details of an example of an intensity select switch circuit for the controller according to some aspects of the present disclosure.

FIGS. 3-5 illustrate various details of the circuit blocks of the controller 220 in FIG. 2. FIG. 3 is a schematic diagram illustrating some details of an example voltage regulator circuit (e.g., the voltage regulator circuit 222) for the controller 220 according to some aspects of the present disclosure. The voltage regulator circuit 222 may receive the output voltage from the power supply of the driver (e.g., the driver 210), and output a regulated voltage to the internal circuitry of the controller 220. The voltage regulator circuit 222 may also provide the regulated output voltage to the pulse width modulator circuit 224.

FIG. 4A is a schematic diagram illustrating some details of an example of a pulse-width modulator circuit (e.g., the PWM circuit 224 and the color temperature select switch circuit 225) for the controller 220 according to some aspects of the present disclosure. The pulse width modulator (PWM) circuit 224 may receive the regulated voltage from the voltage regulator circuit 222, and provide a pulse width modulated signal to the switching circuit 226 to provide pulse width modulated control of the light engine 230. FIG. 4B is a schematic diagram illustrating some details of an example of a switching circuit (e.g., the switching circuit 226) for the controller 220 according to some aspects of the present disclosure. FIG. 5 is a schematic diagram illustrating some details of an example of an intensity select switch circuit (e.g., the intensity select switch circuit 223) for the controller 220 according to some aspects of the present disclosure. The intensity select switch circuit 223 may receive dimming signals from the driver (e.g., the driver 210) and may control the intensity level of the lighting elements according to the setting of the intensity select switch 123.

Figure 6A:
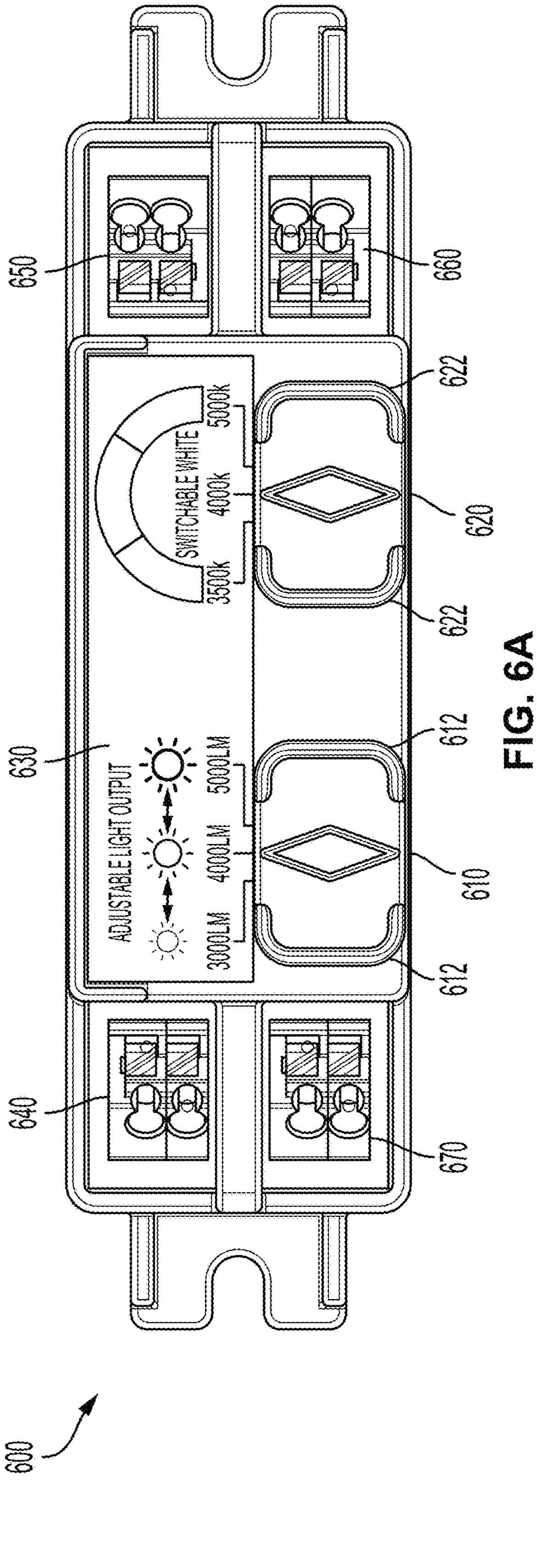
FIG. 6A is a diagram illustrating a top view of an example of a controller according to some aspects of the present disclosure.

FIG. 6A is a diagram illustrating a top view of an example of a controller 600 according to some aspects of the present disclosure. The controller 600 may be, for example, the controller 120. Referring to FIG. 6A, controller 600 may include switch covers 610, 620, a label 630, and connectors 640-670. The switch covers 610, 620 may be disposed on an exterior portion of the controller 600 and may be accessible to a user to manually select intensity and color temperature of light emitted by a light engine. The label 630 may include graphics and lettering corresponding to the positions of the switch covers 610, 620 for the intensity select and color temperature select switches (e.g., the intensity select switch 123 and the color temperature select switch 125), respectively. Other indicators of the switch positions, for example, but not limited to, stencils, molded indicators, etc., may be used without departing from the scope of the present disclosure. For example, the label 630 may indicate positions of the switch cover 610 corresponding to the adjustable light outputs (intensity) of 3000 lm, 4000 lm, and 5000 lm. Similarly, the label 630 may indicate positions of the switch cover 620 corresponding to the switchable color temperatures of 3500K, 4000K, and 5000K. The switch covers 610, 620 may provide for detents to provide a tactile indication of the switch positions. In addition, the switch covers may include ridges 612, 622 to provide for positive engagement of a user's fingers.

The connector(s) 640 may provide for wiring connections to the driver (e.g., the driver 110) for powering the controller and the light engine (e.g., the light engine 130). The connector(s) 650 may provide for wiring connections to pass the power provided from the driver through the controller to the light engine. The connector(s) 660 may provide for wiring connections from the light engine to the PWM and switching circuitry (e.g., the PWM circuit 224 and the switching circuit 226) for controlling the color temperature of the light emitted by the light engine. The connector(s) 670 may provide for wiring connections between the controller and the driver to control the light intensity of the light engine.

While the connectors 640-670 are illustrated as being oriented towards a top portion of the controller 600, the connectors may be oriented in other directions, for example, towards the sides, ends, or bottom of the controller to accommodate various interior or exterior placements of the controller in various types of lighting fixtures. Further, while the connectors 640-670 are illustrated as insertion type connectors, other types of connections, for example, but not limited to, screw type connectors, clamp type connectors, flying leads, etc., may be used without departing from the scope of the present disclosure.

Figure 6B:
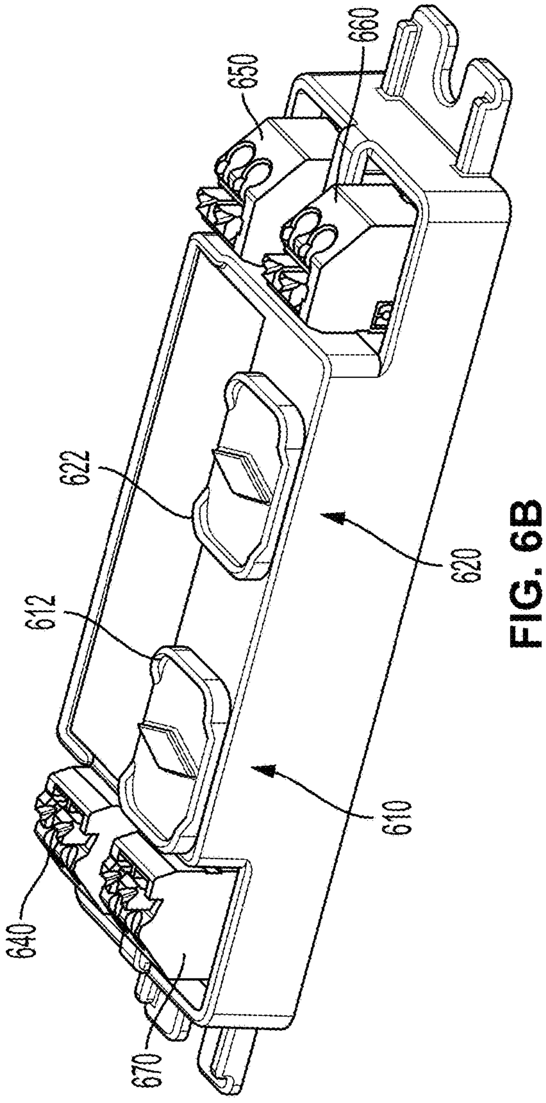
FIG. 6B is a perspective view of an example of a controller according to some aspects of the present disclosure.

FIG. 6B is a perspective view of an example of a controller according to some aspects of the present disclosure. Referring to FIG. 6B, aspects of the switch covers 610, 620 and the ridges 612, 622 of the switch covers, as well as aspects of the connectors 640-670, can be more clearly seen.

Figure 7A:
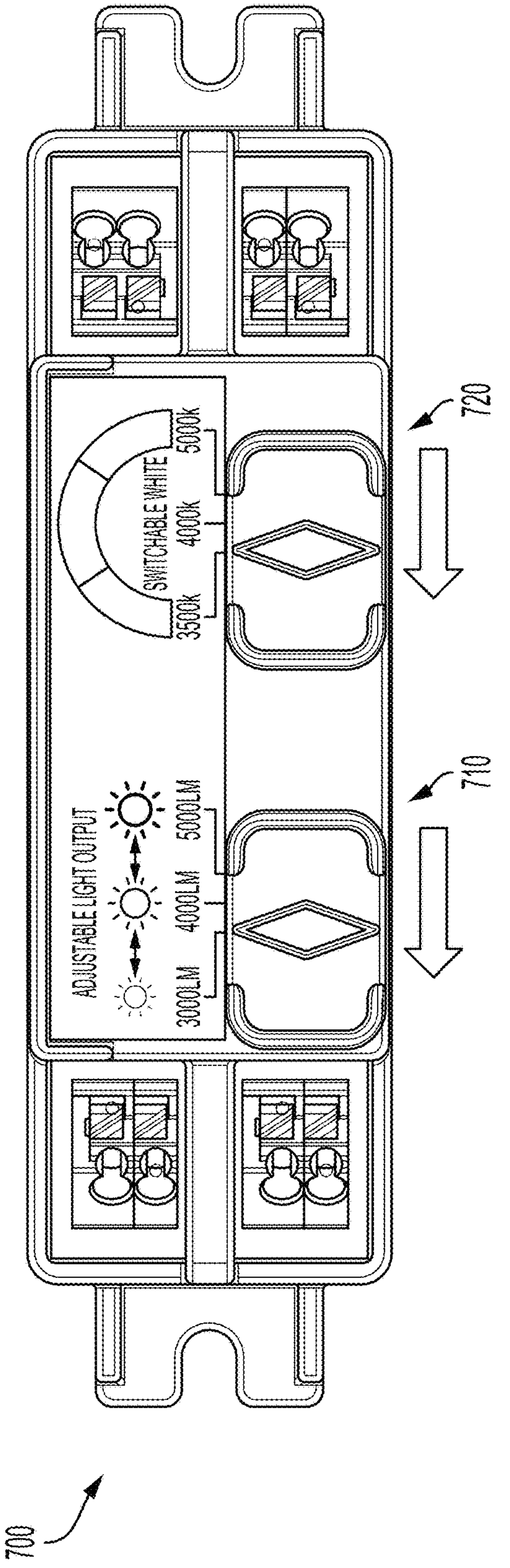
FIGS. 7A, 7B, and 7C are diagrams illustrating a top view of an example of a controller showing switch positions according to some aspects of the present disclosure.
Figure 7B:
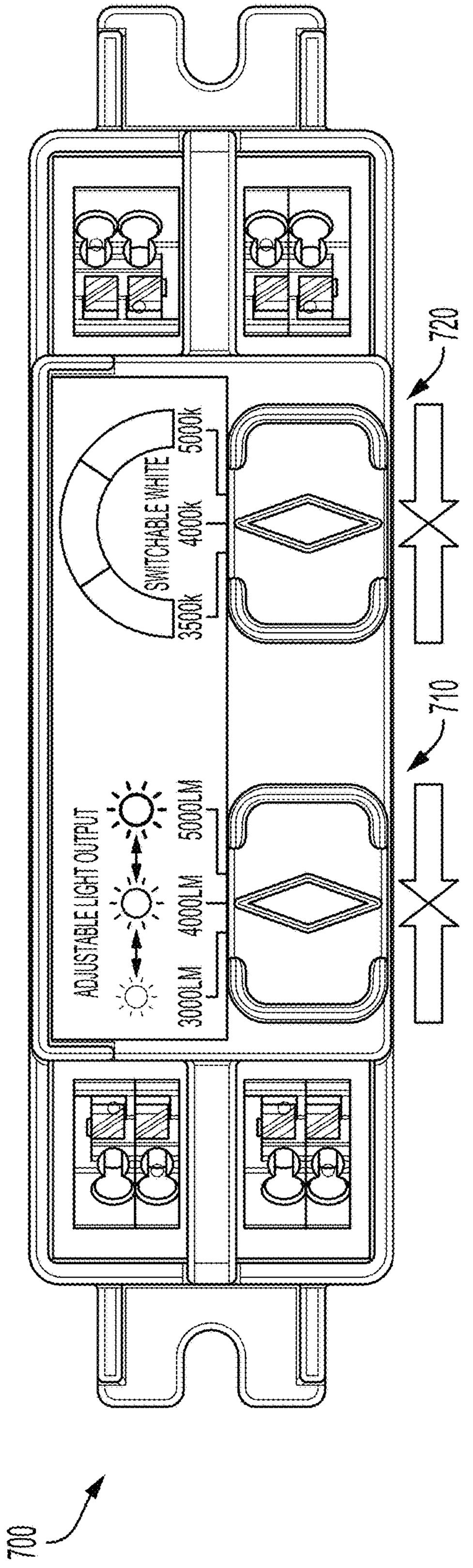
Figure 7C:
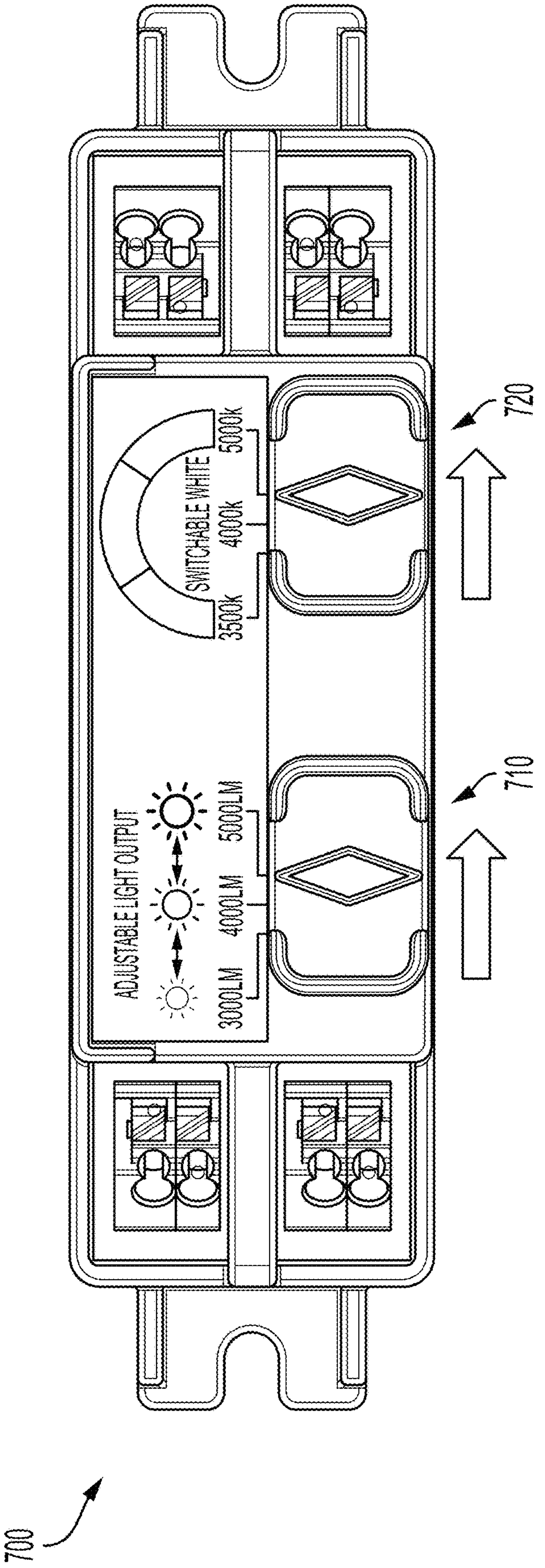

FIGS. 7A, 7B, and 7C are diagrams illustrating a top view of an example of a controller 700 showing switch positions according to some aspects of the present disclosure. The controller 700 may be, for example, the controller 120. FIG. 7A shows the intensity select switch cover 710 in the leftmost position to select the adjustable light output of 3000 lm and the color temperature select switch cover 720 in the leftmost position to select the color temperature of 3500K. FIG. 7B shows the intensity select switch cover 710 in the center position to select the adjustable light output of 4000 lm and the color temperature select switch cover 720 in the center position to select the color temperature of 4000K. FIG. 7C shows the intensity select switch cover 710 in the rightmost position to select the adjustable light output of 5000 lm and the color temperature select switch cover 720 in the rightmost position to select the color temperature of 5000K.

FIG. 8 is a table 800 showing the light intensity and color temperature of the light emitted by a light fixture corresponding to the positions of the selectable intensity (left) and color temperature (right) switches of the controller according to some aspects of the present disclosure. While the table 800 shows nine combinations of switch positions (e.g., three positions of each of the intensity select switch and the color temperature select switch), more or fewer switch positions corresponding to more or fewer intensity and color temperature selections may be implemented without departing from the scope of the present disclosure.

Figure 9:
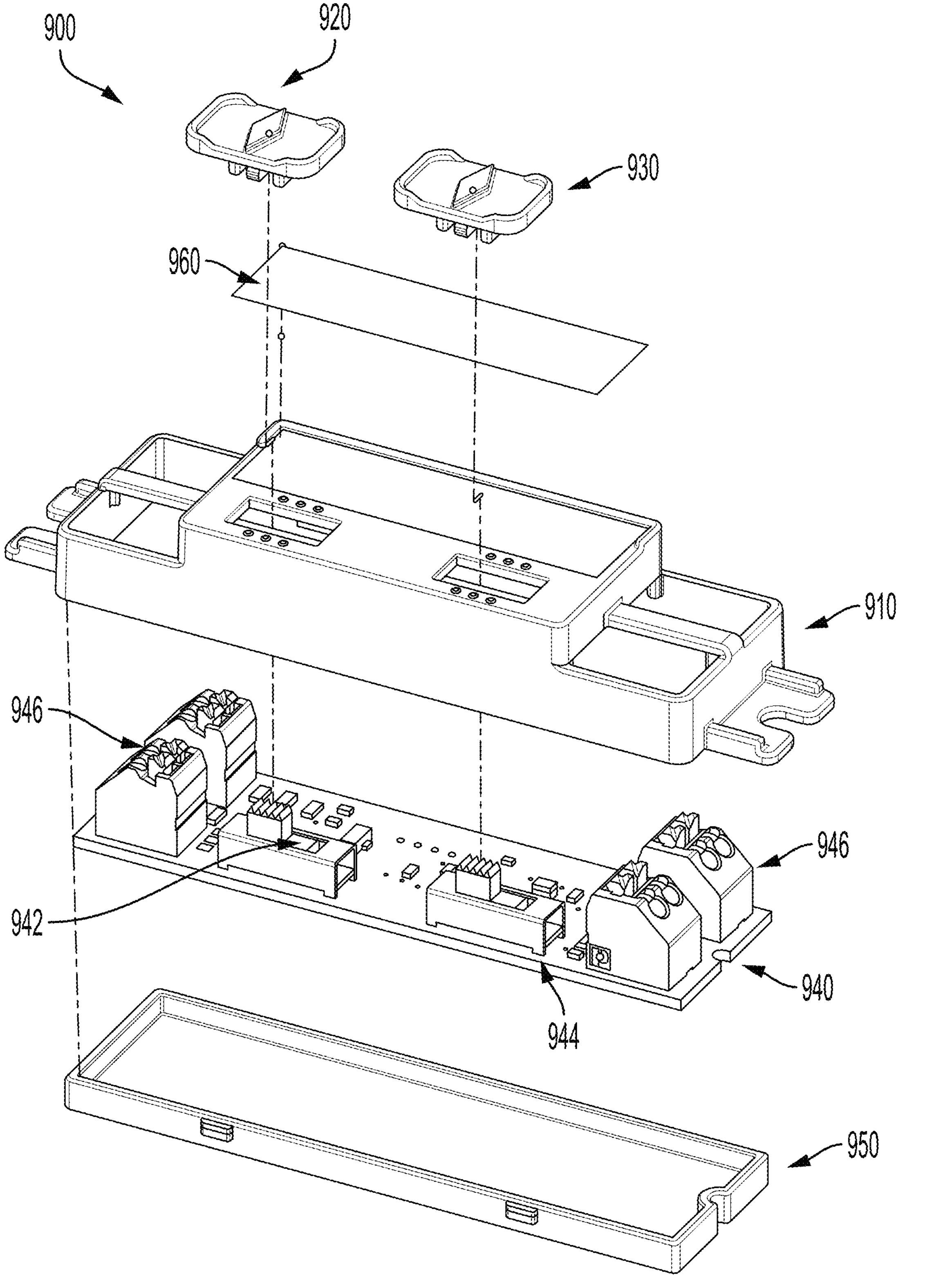
FIG. 9 is an exploded view of a controller according to some aspects of the present disclosure.

FIG. 9 is an exploded view of a controller 900 according to some aspects of the present disclosure. The controller 900 may be, for example, the controller 120. Referring to FIG. 9, the controller 900 may include a housing 910, an intensity select switch cover 920, color temperature select switch cover 930, a printed circuit board (PCB) assembly 940, and a housing bottom cover 950. The housing 910 and the housing bottom cover 950 may enclose the PCB assembly 940. The PCB assembly 940 may include the connectors 946 (e.g., the connectors 640-670 as described with respect to FIG. 6), the intensity select switch 942, the color temperature select switch 944, as well as the circuitry described with respect to FIGS. 2-5. The housing 910 and the switch covers 920, 930 may implement detents to provide tactile indications of the switch positions. A label 960 or other indicator may include graphics or lettering or both corresponding to the positions of the switch covers to indicate the selected light intensity and color temperature.

Figure 10:
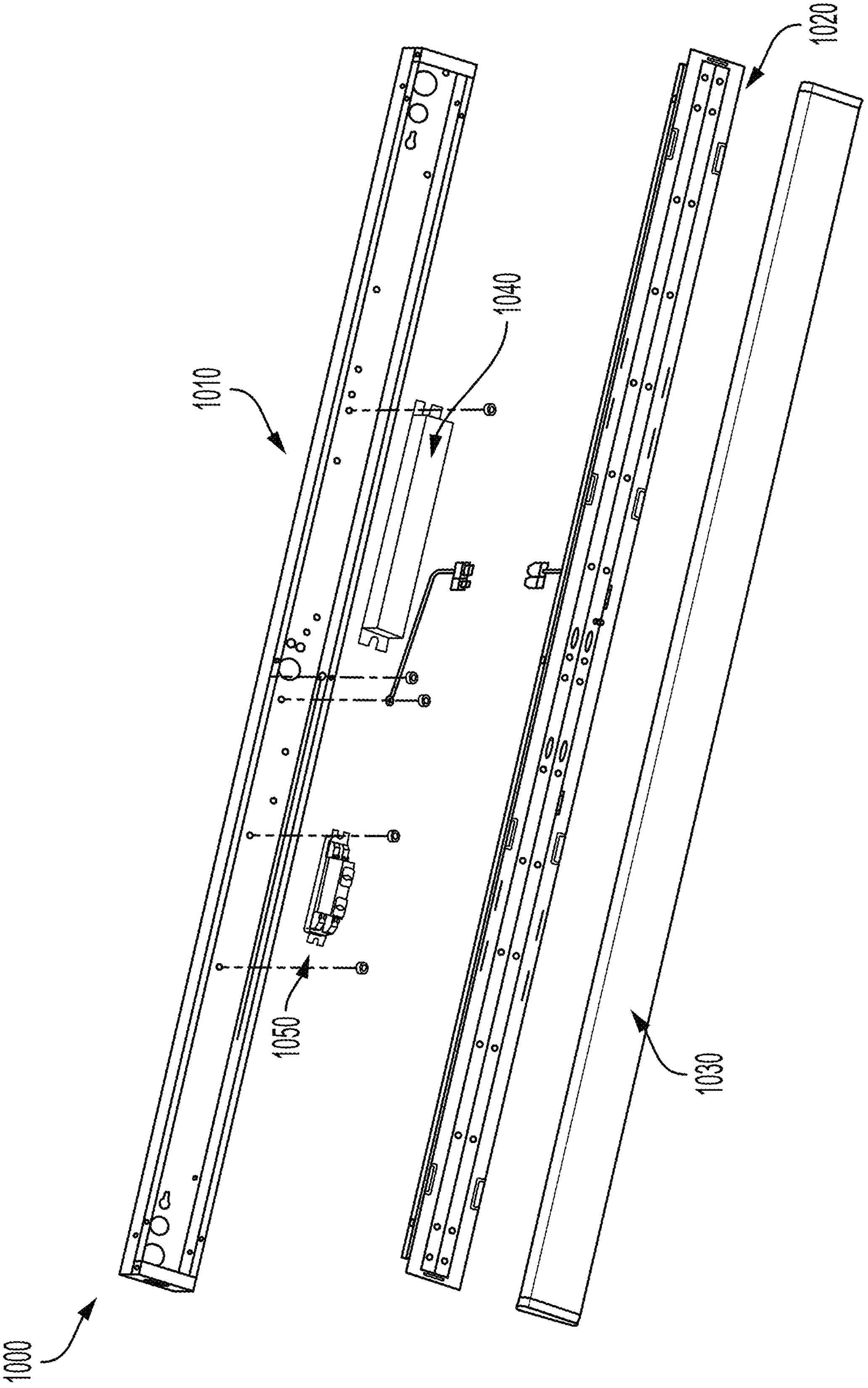
FIG. 10 is a diagram illustrating an example of a light fixture including a controller according to some aspects of the present disclosure.

FIG. 10 is a diagram illustrating an example of a light fixture 1000 including a controller 1050 according to some aspects of the present disclosure. The controller 1050 may be, for example, the controller 120. Referring to FIG. 10, the light fixture 1000 may include a housing 1010, a channel cover assembly 1020, a lens 1030, a driver 1040 (e.g., the driver 110), and a controller 1050. The channel cover assembly 1020 may include a light engine (not shown). As illustrated in FIG. 10, the form factor and low profile of the controller 1050 can enable the controller to be mounted inside the housing 1010.

While FIG. 10 illustrates a contractor single strip (CSS) type light fixture, the form factor and profile of the controller can enable the controller to be utilized in a variety of other light fixtures without departing from the scope of the present disclosure.

Figure 11:
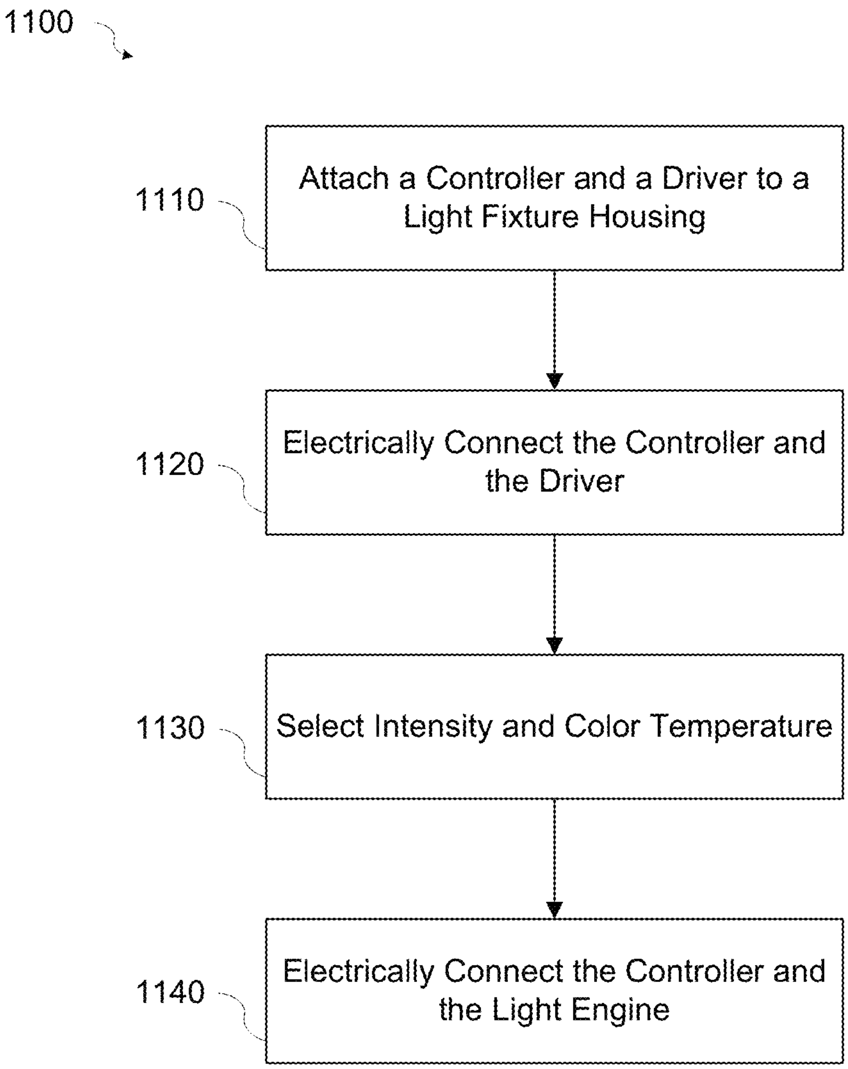
FIG. 11 is a flowchart illustrating a method 1100 for installing a controller in a light fixture according to some aspects of the present disclosure.

FIG. 11 is a flowchart illustrating a method 1100 for installing a controller in a light fixture according to some aspects of the present disclosure. Referring to FIG. 11, at block 1110, the controller (e.g., the controller 120 or 220) and a driver (e.g., the driver 110 or 210) may be attached to the light fixture housing. The driver may be attached simultaneously with, prior to, or subsequent to the installation of the controller. The connectors of the controller may be oriented to enable installation of the controller to the interior or exterior of the light fixture housing.

At block 1120, wiring connections may be made between the controller and the driver. The connectors (e.g., the connectors 640-670) of the controller may be, for example, but not limited to, insertion type connectors, screw type connectors, clamp type connectors, flying leads, etc. It should be appreciated that any type of suitable connector may be used without departing from the scope of the present disclosure. The wiring connections between the controller and the driver may be configured, for example, as illustrated in FIG. 1.

At block 1130, the light intensity and color temperature for the light fixture may be selected. For example, the light intensity may be selected using the light intensity select switch cover to move the light intensity select switch to the appropriate position as indicated on a label affixed to the controller housing or other indicator on the housing. Similarly, the color temperature may be selected using the color temperature select switch cover to move the color temperature select switch to the appropriate position as indicated on the label affixed to the controller housing or other indicator on the housing. The first switch cover, the second switch cover, and the exterior portion of the controller may cooperate to provide detents indicating positions of the first switch and the second switch corresponding to the selected light intensity and color temperature.

At block 1140, wiring connections may be made between the controller and the light engine. The wiring connections between the controller and the light engine (e.g., the light engine 130) may be configured, for example, as illustrated in FIG. 1.

The specific operations illustrated in FIG. 11 provide a particular method for installing a controller in a light fixture according to an embodiment. Other sequences of operations may also be performed according to alternative embodiments. For example, alternative embodiments of the present invention may perform the operations outlined above in a different order. Moreover, the individual operations illustrated in FIG. 11 may include multiple sub-operations that may be performed in various sequences as appropriate to the individual operations. Furthermore, additional operations may be added or removed depending on the particular applications.

Other implementations of other types of light fixtures deployed in conjunction with embodiments of the present disclosure are possible without departing from the scope of protection.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A controller for a light fixture, the controller comprising:

a controller housing configured to mount to a light fixture housing;

first electrical connectors configured to electrically connect the controller to a driver;

second electrical connectors configured to electrically connect the controller to a light engine;

light intensity control circuitry configured to receive signals from the driver via the first electrical connectors and generate signals to the light engine via the second electrical connectors to control light intensity produced by the light engine, wherein the signals to the light engine are generated based on a setting of a regulator circuit;

color temperature control circuitry configured to receive pulse width modulated signals and generate signals to the light engine via the second electrical connectors to control color temperature of light produced by the light engine;

a first switch having a first switch cover disposed on an exterior portion of the controller housing, the first switch configured to communicate with the light intensity control circuitry and operable to cause the light engine to produce a specified light intensity based on a position of the first switch cover, wherein the first switch is configured to select one of a first resistor in a first position, a second resistor in a second position, or a third resistor in a third position, wherein a resistor selection is operable to set a reference voltage for the regulator circuit; and a second switch having a second switch cover disposed on the exterior portion of the controller housing, the second switch configured to communicate with the color temperature control circuitry and operable to cause the light engine to produce a specified color temperature of light based on a position of the second switch cover, wherein the position of the first switch cover and the position of the second switch cover are manually selectable.

2. The controller of claim 1, wherein a form factor and profile of the controller are configured to mount the controller between an interior surface of the light fixture housing and the light engine.

3. The controller of claim 1, wherein the color temperature control circuitry comprises pulse width modulator circuitry, wherein the position of the second switch cover causes the pulse width modulator circuitry to provide separate pulse width modulated signals to separate light elements of the light engine to cause the light engine to produce light having different color temperatures.

4. The controller of claim 1, wherein the position of the first switch cover and the position of the second switch cover independently control the light intensity and the color temperature, respectively, produced by the light engine.

5. The controller of claim 1, wherein the first switch cover, the second switch cover, and the exterior portion of the controller cooperate to provide detents indicating positions of the first switch and the second switch.

6. The controller of claim 5, wherein a selected light intensity and a selected color temperature corresponding to positions of the first switch cover and the second switch cover, respectively, are indicated by graphics or lettering disposed on the exterior portion of the controller.

7. A light fixture, comprising:

a light engine; and a controller coupled to the light engine, the controller comprising:

a controller housing configured to mount to a light fixture housing;

first electrical connectors configured to electrically connect the controller to a driver;

second electrical connectors configured to electrically connect the controller to the light engine;

light intensity control circuitry configured to receive signals from the driver via the first electrical connectors and generate signals to the light engine via the second electrical connectors to control light intensity produced by the light engine, wherein the signals to the light engine are generated based on a setting of a regulator circuit;

color temperature control circuitry configured to receive pulse width modulated signals and generate signals to the light engine via the second electrical connectors to control color temperature of light produced by the light engine;

a first switch having a first switch cover disposed on an exterior portion of the controller housing, the first switch configured to communicate with the light intensity control circuitry and operable to cause the light engine to produce a specified light intensity based on a position of the first switch cover, wherein the first switch is configured to select one of a first resistor in a first position, a second resistor in a second position, or a third resistor in a third position, wherein a resistor selection is operable to set a reference voltage for the regulator circuit; and a second switch having a second switch cover disposed on the exterior portion of the controller housing, the second switch configured to communicate with the color temperature control circuitry and operable to cause the light engine to produce a specified color temperature of light based on a position of the second switch cover, wherein the position of the first switch cover and the position of the second switch cover are manually selectable.

8. The light fixture of claim 7, wherein a form factor and profile of the controller housing are configured to mount the controller housing between an interior surface of the light fixture housing and the light engine.

9. The light fixture of claim 7, wherein the light engine comprises a set of light elements, each set of light elements comprising a string of light emitting diodes (LEDs), each string of LEDs configured to produce light having a different color temperature than other strings of LEDs.

10. The light fixture of claim 9, wherein the color temperature control circuitry of the controller comprises pulse width modulator circuitry, and wherein the position of the second switch cover causes the pulse width modulator circuitry to provide separate pulse width modulated signals to separate light elements of the light engine to cause the light engine to produce light having different color temperatures.

11. The light fixture of claim 7, wherein the position of the first switch cover and the position of the second switch cover independently control the light intensity and the color temperature, respectively, produced by the light engine.

12. The light fixture of claim 7, wherein the first switch cover, the second switch cover, and the exterior portion of the controller housing cooperate to provide detents indicating positions of the first switch and the second switch.

13. The controller of claim 12, wherein a selected light intensity and a selected color temperature corresponding to positions of the first switch cover and the second switch cover, respectively, are indicated by graphics or lettering disposed on the exterior portion of the controller housing.

14. A method of installing a controller for a light fixture, the controller including:

a controller housing;

a first selector switch positionable on the controller housing;

a second selector switch positionable on the controller housing;

first electrical connectors; and second electrical connectors;

the method comprising:

attaching the controller housing to a surface of a light fixture housing;

electrically connecting the controller to a light engine driver via the second electrical connectors, wherein signals to control light intensity produced by the light engine are generated based on a setting of a regulator circuit;

electrically connecting the controller to a light engine via the first electrical connectors; and independently selecting, with the first selector switch, the light intensity for the light fixture based on a position of the first selector switch, wherein the first switch is configured to select one of a first resistor in a first position, a second resistor in a second position, or a third resistor in a third position, wherein a resistor selection is operable to set a reference voltage for the regulator circuit; and independently selecting, with the second selector switch, a color temperature for the light fixture based on a position of the second selector switch.

15. The method of claim 14, wherein the first selector switch comprises a first switch cover, and wherein selecting a light intensity comprises:

manually selecting a position of the first switch cover disposed on an exterior portion of the controller housing, wherein the selection of the light intensity is indicated by graphics or lettering disposed on the exterior portion of the controller housing.

16. The method of claim 15, wherein the first switch cover and the exterior portion of the controller housing cooperate to provide detents indicating positions of the first switch cover corresponding to the selected light intensity.

17. The method of claim 14, wherein the second selector switch comprises a second switch cover, and wherein selecting a color temperature comprises:

manually selecting a position of a second switch cover disposed on an exterior portion of the controller housing, wherein the selection of the color temperature is indicated by graphics or lettering disposed on the exterior portion of the controller housing.

18. The method of claim 17, wherein the second switch cover and the exterior portion of the controller housing cooperate to provide detents indicating positions of the second switch cover corresponding to the selected color temperature.

19. The method of claim 14, wherein mounting the controller to a surface of the light fixture housing comprises mounting the controller housing between an interior surface of the light fixture housing and the light engine.

20. The method of claim 14, wherein mounting the controller to a surface of the light fixture housing comprises mounting the controller to an exterior of the light fixture housing.

* * * * *